Nov. 3, 1953     C. V. TIDSWELL     2,657,662
BICYCLE WHISTLE
Filed May 16, 1951
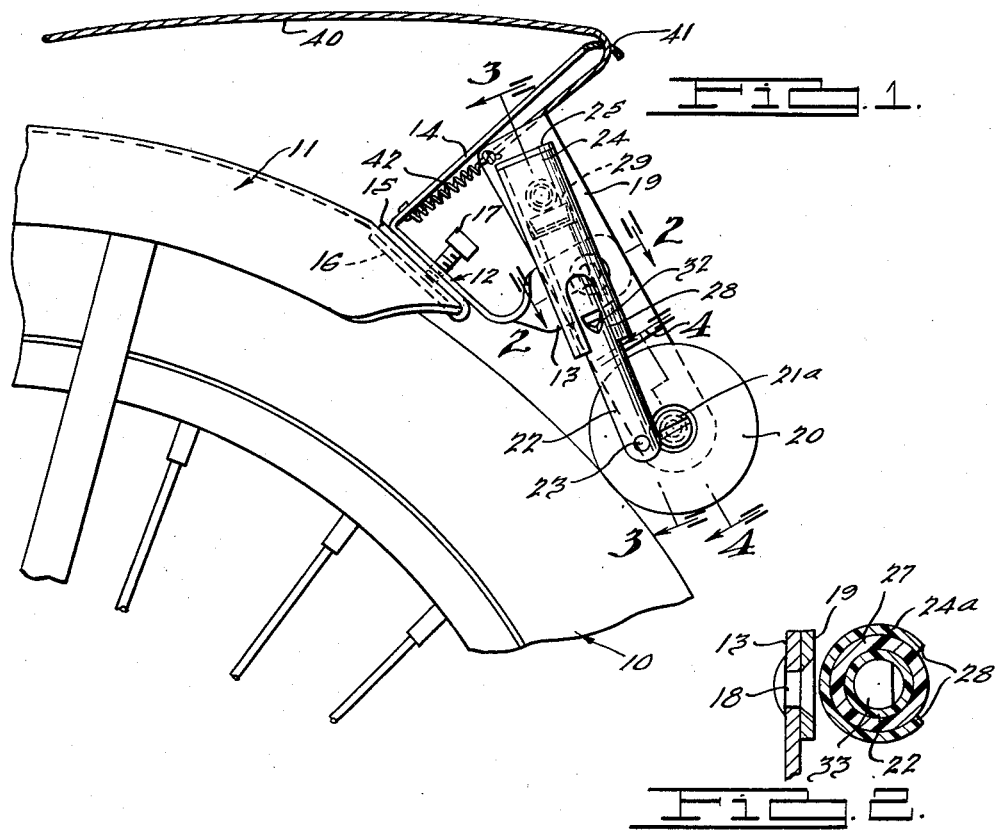
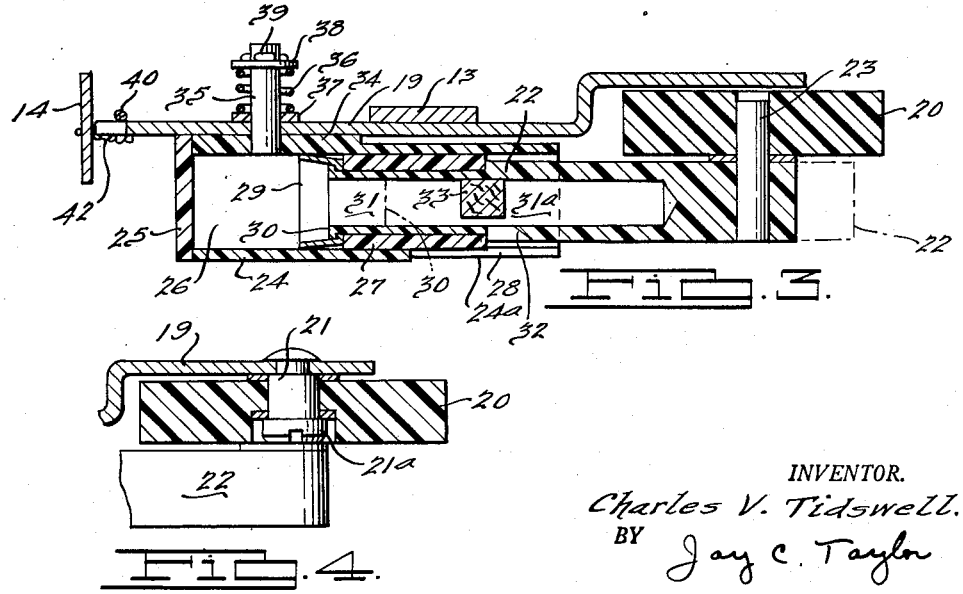
INVENTOR.
Charles V. Tidswell.
BY Jay C. Taylor
ATTORNEY.

Patented Nov. 3, 1953

2,657,662

UNITED STATES PATENT OFFICE 2,657,662

BICYCLE WHISTLE

Charles Victor Tidswell, Adrian, Mich.

Application May 16, 1951, Serial No. 226,614

2 Claims. (Cl. 116—58)

This invention relates to improvements in a warning or signaling device comprising an air whistle and mounting therefor suitable for use with a bicycle, for example.

An object of the present invention is to provide an improved air whistle mechanism operated by relatively reciprocating plunger and air chamber elements operatively connected eccentrically with a driven wheel or roller, the latter being rotated by engagement with a wheel of the bicycle whereby the plunger and cylinder elements are in turn actuated to pump air through an air whistle.

Other objects are to provide an air whistle mechanism of the foregoing character including a novel and improved arrangement of parts whereby the mechanism is feasibly mounted on the forward projection of the front fender of the bicycle, and to provide simple and improved means for securing the mechanism in operative position to said fender projection whereby the bicycle rider selectively operates the whistle by swinging the driven wheel of the whistle mechanism into engagement with the bicycle wheel for rotation thereby.

Another object is to provide a rugged compact whistle mechanism of the foregoing character wherein the whistle element extends coaxially within the plunger and communicates through the latter with the air chamber. In order to achieve a compact structure, the discharge opening for the whistle extends through the sidewall of the plunger element adjacent the outer end of the air chamber when the plunger is at its inward limit of reciprocating movement, the plunger being withdrawn substantially its full length from the air chamber at the outer limit of reciprocating movement, in which position the plunger is closely supported by axially outward extending guide portions of the sidewalls of the air chamber. Extending longitudinally within these guide portions for the length of reciprocating movement is an air vent slot juxtaposed to the whistle discharge opening to receive air discharged therefrom.

Preferably the inner end of the plunger comprises a portion conforming closely to the sidewalls of the chamber and guide portions and extending longitudinally the length of the reciprocating movement. Accordingly, a superior rugged and compact mechanism is provided which is especially adapted for use with a bicycle. In such use, by reason of the general lack of rigidity of bicycle fenders, a rugged whistle construction is particularly necessary. Otherwise, the mechanism is quickly damaged when the driven wheel of the whistle mechanism vibrates out of proper alignment with the bicycle wheel, as invariably happens during operation at high speeds. Likewise the foregoing construction achieves a plunger arm of minimum length, whereby the rigidity and ruggedness of the assembly is materially increased, as will be noted from the following detailed description.

Other objects of this invention will appear in the following description and appended claims, reference being had to the accompanying drawings forming a part of this specification wherein like reference characters designate corresponding parts in the several views.

Fig. 1 is a fragmentary elevation of a front end portion of a bicycle showing a whistle mechanism embodying the present invention mounted thereon.

Fig. 2 is an enlarged transverse sectional view taken in the direction of the arrows, substantially along the line 2—2 of Fig. 1.

Fig. 3 is an enlarged sectional view taken in the direction of the arrows substantially along the line 3—3 of Fig. 1 and longitudinally of the plunger and air chamber.

Fig. 4 is an enlarged fragmentary sectional view taken in the direction of the arrows substantially along the line 4—4 of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a preferred embodiment of the present invention is illustrated by way of example mounted on a bicycle having the usual front wheel 10 and front fender 11. The whistle mechanism includes a fixed bracket portion indicated generally by the numeral 12 and comprising a forward upright arm 13 and a longer rearward upright arm 14. Intermediate the arms 13 and 14 is a flat strip 15 preferably welded to the underside of the base of the bracket 12 and having an integral under portion 16 bent rearward in a hairpin loop. The portions 15 and 16 are spaced to provide a fender receiving slot therebetween adapted to receive the forward end of the fender 11 snugly therein. A clamping bolt 17 screws through the double thickness bracket base portions 12 and 15 into the fender receiving slot and clamps tightly against the inserted fender.

Pivoted on the forward arm 13 by means of a flanged rivet 18 is a wheel supporting arm 19, Fig. 2, having a driven wheel 20 suitably journaled at its forward end on a spindle 21, Fig. 4. One end of the spindle 21 extends through the arm 19 and is secured thereto, the other end being preferably secured to the wheel 20 by a screw 21a countersunk in the face of the wheel 20 to permit reciprocating movement of a plunger shaft 22, Fig. 4. The shaft 22 is pivoted at its forward end eccentrically to the wheel 20 by a wrist pin 23, Fig. 3. From the wheel 20, the plunger shaft 22 extends rearward into the open forward end of a cylinder 24 having its rearward end closed by an end plate 25 to provide an air compressing chamber 26. The inner or rearward end of the shaft 22 is provided with a coaxial longitudinal cylindrical plunger portion 27 which reciprocates within the cylinder 24 upon rotation of the wheel 20 and is dimensioned to conform snugly to the interior walls of the cylinder 24 for support thereby. The plunger 27 and cooperating cylinder walls thus comprise a guide to position and support the shaft 22 in axial alignment with the cylindrical chamber 26.

Extending longitudinally rearward in the sidewalls of the cylinder 24 from its forward end and for the length of reciprocating movement is an air vent slot 28, Figs. 1, 2 and 3. It is accordingly apparent that the air compressing chamber 26 terminates forwardly at the rearward end of the vent slot 28, even though portions of the sidewalls of the cylinder 24 continue forward at 24a for the length of the vent slot 28, Fig. 3. The forward extension 24a of the cylinder 24 serves primarily to guide and support the plunger 27 upon its withdrawal from the chamber 26.

Preferably the length of the plunger portion or guide 27 approximately equals the length of reciprocating movement of the shaft 22, which is also preferably greater than the diameter of the chamber 26 in order to assure adequate air compression for operation of an air whistle, as discussed below. The length of the shaft 22 and disposition of the plunger or guide 27 thereon are determined so that the forward end of the latter will be withdrawn substantially to the forward end of the cylinder extension 24a at the forward or outward limit of reciprocating movement, as indicated in phantom, Fig. 3. Conversely, at the rearmost or innermost limit of reciprocating movement, the plunger 27 will extend substantially its full length into the chamber 26 and the forward outer end of the plunger 27 will be adjacent the rearward or inward end of the air vent slot 28.

Secured on a rearward or inner extension of the shaft 22 is an annular flexible piston element 29 supported in position between the rearmost end of the plunger 27 and an annular end flange 30 of the shaft 22. Opening axially into the chamber 26 through the piston 29 is a whistle bore 31 extending coaxially forward into the shaft 22 and opening through the sidewall of the latter at 32 immediately forward of the plunger portion 27 and in alignment with the vent slot 28. A constrictor 33 is secured within the bore 31 opposite the discharge opening 32, whereby air discharged through the latter during a rearward compression stroke of the piston 29 causes a whistle sound. The bore 31 extends forward of the constrictor 33 at 31a to comprise a resonance chamber.

The rearward end of the cylinder 24 is provided with a flat exterior sidewall portion 34 which rests against a mating flat surface of the pivotal arm 19 and comprises a bearing surface for pivotal movement of the cylinder 24. The latter is pivoted to the arm 19 by a stud 35 extending from the flat side 34 through the arm 19. A retaining spring 36 under compression between inner and outer washers 37 and 38 holds the confronting surfaces of the arm 19 and flat 34 in juxtaposition, the washer 37 being located freely on the stud 35 adjacent the side of the arm 19 opposite the flat 34 and the washer 38 being held on the stud 35 by a key 39. Thus the cylinder 24 is free to pivot in axial alignment with the shaft 22, as the latter reciprocates upon rotation of the wheel 20. The latter as indicated in Fig. 1 is located tangentially to the bicycle wheel 10 and is forced into frictional driven engagement therewith by means of a cord 40 secured to the rearward end of the pivotal arm 19 and passing through an eye 41 in the upper end of the arm 14.

In order to operate the whistle, the bicycle rider merely pulls the cord 40 to swing the arm 19 and driven wheel 20 into engagement with the wheel 10. Upon release of the cord 40, the pivotal wheel 20 is pivoted upward and away from the wheel 10 by a coil spring 42 connected under tension between the frame 12 and rearward end of the arm 19. By virtue of the foregoing construction, including the air vent slot 28 in the forward end of the cylinder 24, the length of the shaft 22 is materially shortened without sacrificing support for the plunger 27. In addition, by virtue of the length of the plunger 27, as well as the cylinder extension 24a, which is approximately equal to the length of the plunger stroke, the plunger 27 is adequately supported at all times, even at its foremost position withdrawn from the air chamber 26. In consequence of the compactness of construction, an exceptionally rugged and durable whistle mechanism is achieved capable of withstanding the severe usage and operational forces to which it is ordinarily subjected when mounted on a bicycle.

I claim:

1. In a signal device for a wheeled vehicle, an adjustable mounting bracket, a movable arm centrally pivoted on the bracket, a traction wheel mounted on the forward end of the movable arm and adapted for selective driving engagement with one of the vehicle wheels, resilient means connected between the bracket and the rearward end of the movable arm yieldably holding the traction wheel out of driving engagement, selective means on the movable arm for pivoting the movable arm so as to bring the traction wheel into driving engagement with the vehicle wheel, an air cylinder pivoted on the rearward end of the movable arm, a hollow plunger eccentrically pivoted on the traction wheel and adapted for reciprocation in the air cylinder, a resilient piston on the free end of the plunger, a whistle orifice in the sidewall of the plunger in communication with the working face of the piston and a constrictor in the plunger for directing a high velocity flow of air through the whistle orifice.

2. In a signal device for a wheeled vehicle, an adjustable mounting bracket, a movable arm centrally pivoted on the bracket, a traction wheel mounted on the forward end of the movable arm and adapted for selective driving engagement with one of the vehicle wheels, resilient means connected between the bracket and the rearward end of the movable arm yieldably holding the traction wheel out of driving engagement, selective means on the rearward end of the movable arm for bringing the traction wheel into driving engagement with the vehicle wheel, an air cylinder pivoted on the movable arm, a hollow plunger eccentrically pivoted on the traction wheel and adapted for reciprocation in the air cylinder, a whistle orifice in the sidewall of the plunger in communication with the working face of the plunger, a constrictor in the hollow plunger for directing air through the whistle orifice and providing a resonance chamber for the whistle.

CHARLES VICTOR TIDSWELL.

References Cited in the file of this patent

UNITED STATES PATENTS

| Number | Name | Date |
|---|---|---|
| 573,555 | Swearingen et al. | Dec. 22, 1896 |
| 593,786 | Sobinski | Nov. 16, 1897 |
| 636,487 | Butcher | Nov. 7, 1899 |
| 679,825 | Blomster et al. | Aug. 6, 1901 |
| 1,686,233 | Halliday | Oct. 2, 1928 |

FOREIGN PATENTS

| Number | Country | Date |
|---|---|---|
| 530,254 | France | Sept. 28, 1921 |